L. W. CHUBB.
ELECTROLYTIC CELL.
APPLICATION FILED APR. 5, 1917.

1,305,443.

Patented June 3, 1919.

WITNESSES:
Fred. A. Lind
Fred H. Miller

INVENTOR
Lewis W. Chubb
BY
Wesley G. Carr
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC & MANUFACTURING COMPANY, A CORPORATION OF PENNSYLVANIA.

ELECTROLYTIC CELL.

1,305,443.  Specification of Letters Patent.  Patented June 3, 1919.

Application filed April 5, 1917. Serial No. 159,968.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Electrolytic Cells, of which the following is a specification.

My invention relates to electrolytic cells such as condensers, lightning arresters, rectifiers and the like, and it has for its object to provide a cell of the above-indicated character in which substantially all of the electrolytically active portions of the cell shall be completely immersed in the electrolyte for the purpose of avoiding the harmful effects which are produced in a cell of the character indicated when the active polarizing material intersects the surface of the electrolyte.

Figure 1:
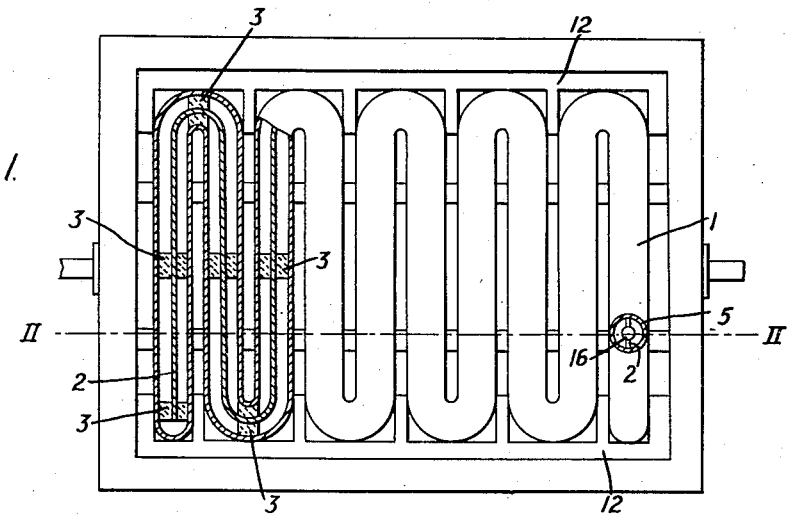
Figure 2:
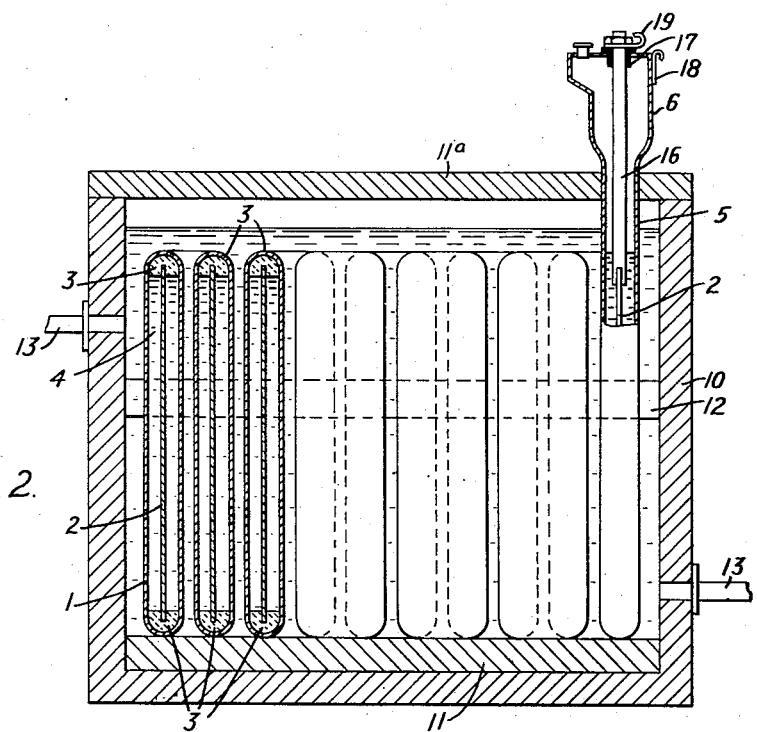

One embodiment of my invention is illustrated in the accompanying drawing, in which Figure 1 is a plan view, with parts shown in section and with the cover removed, of an electrolytic cell provided with means for maintaining the cell completely filled with electrolyte, and Fig. 2 is a side view, partially in elevation and partially in section, of the structure shown in Fig. 1, the section being taken substantially along the line II—II, Fig. 1.

The cell shown in the accompanying drawing comprises a flexed electrolyte container 1 of aluminum, tantalum, magnesium or other film-forming material, which may conveniently be formed by flattening a tube of the selected material and bending the flattened tube in a series of side-by-side parallel convolutions, as shown in Fig. 1. An electrode strip 2 of the same filming material as the container 1 is inclosed within the container and is spaced from its walls by means of insulating spacers 3 of porcelain or other suitable material which is inert with respect to the electrolyte. The electrode strip 2 conforms to the shape of the container, both sides of the strip 2 being electrolytically active, while only the inner walls of the container are active. The device thus far described is similar to that which is described and claimed in a copending application of Charles Le G. Fortescue, Serial No. 159,659, filed April 4th, 1917.

The electrolyte container 1 is completely filled with a suitable electrolyte 4. In order to permit the expansion and contraction of the electrolyte with varying temperatures, a tube 5 of the same filming material as that composing the container 1 is connected to the top of the container at any convenient point and extends vertically into communication with a receptacle 6 of somewhat larger diameter than the tube 5. Sufficient electrolyte is introduced into the container to bring the level of the liquid into the tube 5, with the result that the only points at which aluminum surfaces cross the surface of the electrolyte are within the small tube 5.

The container 1, with its attachments, is contained within a suitable receptacle 10, of wood, metal or any other desired material, provided with a cover 11ª and with suitable bottom supports 11 and side supports 12 for spacing the container 1 from the walls of the receptacle so that cooling fluid may be passed completely around the container which is provided with inlet and outlet pipes 13 for the introduction and removal of air, water or other cooling fluid.

Suitable terminal devices are attached to the container 1 and to the intermediate electrode 2. As shown, the vertical tube 5 is employed as one terminal and a rod 16 attached at its lower end, to the intermediate electrode 2 and extending upwardly within the tube 5, forms the other terminal. As shown, the rod 16 extends through an insulating bushing 17 in the top of the receptacle 6. Terminal devices 18 and 19 are attached to the upper ends of the receptacle 6 and the rod 16, respectively.

In the operation of the electrolytic cell which I have shown and described, the container is filled with electrolyte, as stated above, until the surface of the electrolyte is within the narrow tube 5, thereby reducing to a minimum the so-called "edge effect" which is produced when the surface of a film-forming electrolyte engages filming material under the influence of impressed electric potential. Such edge effects include a deposition of oxids or other compounds of the filming material and a continuous sparkling or arcing at the surface of the electrolyte which materially increases the power factor losses in the cell. The receptacle 6 provides for any excessive expansion of the electrolyte which may occur if the cell becomes overheated in service.

The structural details which I have shown for the purpose of illustrating my invention are to be understood as being illustrative only, since my invention may be applied to any form of electrolytic cell in which it is desirable to fill the cell completely with electrolyte. I therefore desire that no limitations be imposed upon my invention except such as are indicated in the appended claims.

I claim as my invention:

1. An electrolytic cell comprising a substantially closed electrode forming an electrolyte container adapted to be filled with electrolyte and means for permitting expansion and contraction of the electrolyte in the said container while maintaining the container filled with electrolyte.

2. An electrolytic cell comprising a substantially closed electrode forming an electrolyte container and a tube extending from the top of the said container for permitting expansion of the electrolyte contained therein.

3. An electrolytic cell comprising a substantially closed electrolyte container composed of filming material to provide an electrode and a tube composed of filming material extending from the top of the said container for permitting expansion of the electrolyte contained therein.

4. An electrolytic cell comprising a substantially closed electrolyte container composed of filming material to provide an electrode, a tube composed of filming material extending from the top of the said container for permitting expansion of the electrolyte contained therein, and a receptacle of larger diameter than the said tube and connected to its upper end.

5. An electrolytic cell comprising a substantially closed electrolyte container composed of filming material to form an electrode, an electrode member composed of filming material and disposed within the said container to coöperate electrolytically with the walls of the container, and a tube of filming material extending from the top of the container for permitting expansion of the electrolyte contained therein.

6. An electrolytic cell comprising a substantially closed electrolyte container composed of a flattened tube of filming material flexed in a plurality of adjacent folds to form an electrode, an electrode member inclosed within the said tube and spaced from the walls thereof, and a tube extending from the top of the said container for permitting expansion of the electrolyte contained therein.

7. An electrolytic cell comprising a substantially closed hollow electrode of film-forming material, an expansion chamber, a tube leading from the electrode to the expansion chamber and a second electrode of film-forming material inclosed within the first and adapted to be completely submerged by an electrolyte contained therein.

In testimony whereof, I have hereunto subscribed my name this 3rd day of April, 1917.

LEWIS W. CHUBB.